United States Patent [19]

McCormick

[11] 4,278,790

[45] Jul. 14, 1981

[54] NOVEL CELLULOSE SOLUTIONS

[75] Inventor: Charles L. McCormick, Hattiesburg, Miss.

[73] Assignee: Hopkins Agricultural Chemical Co., Madison, Wis.

[21] Appl. No.: 128,014

[22] Filed: Mar. 7, 1980

Related U.S. Application Data

[63] Continuation-in-part of Ser. No. 929,749, Jul. 31, 1978, abandoned.

[51] Int. Cl.³ .................. C08B 11/00; C08L 1/00; C08L 1/02; C08L 1/26
[52] U.S. Cl. .................. 536/84; 106/163 R; 106/186; 106/196; 106/197 R; 106/197 C; 106/198; 106/203; 536/56
[58] Field of Search ........... 106/163 R, 203, 186, 106/197 R, 197 C, 196, 198; 536/56, 84

[56] References Cited

U.S. PATENT DOCUMENTS

| | | | |
|---|---|---|---|
| 1,746,663 | 2/1930 | Leuchs | 536/84 |
| 1,924,238 | 8/1933 | Graenacher | 536/84 |
| 3,236,669 | 2/1966 | Williams | 106/203 |
| 3,935,022 | 1/1976 | Sihtola | 106/163 R |
| 4,028,132 | 6/1977 | Litt | 106/163 R |
| 4,059,457 | 11/1977 | Austin | 106/203 |
| 4,062,921 | 12/1977 | Austin | 264/233 |
| 4,097,666 | 6/1978 | Johnson et al. | 106/203 |

FOREIGN PATENT DOCUMENTS 876148  7/1971  Canada.

OTHER PUBLICATIONS

Turbank, A. F., et al., "Cellulose Solvents", *Chemtech*, pp. 51–57, Jan. 1980.
Phillipp, B., et al., "Non-Aqueous Solvents of Cellulose", *Chemtech*, pp. 702–708, Nov. 1977.
Chemical Abstracts, vol. 85, No. 16, Oct. 18, 1976, p. 114685n.
Chemical Abstracts, vol. 85, No. 22, Nov. 29, 1976, p. 162159r.

*Primary Examiner*—Ronald W. Griffin
*Attorney, Agent, or Firm*—Quarles & Brady

[57] ABSTRACT

Cellulose solutions containing cellulose dissolved in lithium chloride and dimethylacetamide are useful in preparing cellulose derivatives. The solutions may contain up to about 8% lithium chloride and up to about 3% cellulose. The preparation of cellulose derivatives using the cellulose solutions is also described.

10 Claims, No Drawings

NOVEL CELLULOSE SOLUTIONS

RELATED CASES

The present application is a continuation-in-part of my earlier application Ser. No. 929,749 filed on July 31, 1978 now abandoned.

The present invention relates to novel cellulose solutions and their use.

BACKGROUND OF THE INVENTION

Cellulose is one of the most abundant, renewable organic raw materials in the world. However, the use of cellulose still has not reached its potential in many areas of application. One major reason that it has not been more widely used is that for most applications natural or unmodified cellulose is unsuitable and cellulose derivatives must be used. In order to prepare cellulose derivatives it is often necessary to first dissolve the cellulose and then to transform it into the desired products in solution. Although various methods and techniques for dissolving cellulose do exist, the methods or techniques are often cumbersome and expensive. As a result, the use of cellulose derivatives is often more expensive than the use of alternative materials which compete for the same applications.

The efficiency of existing methods of preparing cellulose derivatives, such as cellulose ethers, on an industrial scale could be greatly improved by the availability of a suitable organic solvent for the unmodified cellulose. Presently, modified cellulose in the form of a sodium cellulose is required as a starting material in all cellulose ether preparations. This must be subjected to a nucleophilic substitution reaction with an alkyl halide or the ring opening addition of an alkylene oxide. Reactions of this type presently are being conducted under heterogeneous conditions in aqueous or organic media. This results in unfavorable reaction kinetics, a loss in reaction efficiency (less than 40%), domination of by-product formation (50% of reacting reagents are lost to the formation of by-products), and very poor yields. In addition, because of the sodium chloride by-product, expensive reactor autoclaves are required.

Cellulose, because of strong hydrogen bonding and high crystallinity, is insoluble in most solvents. In fact, cellulose is soluble only in a few aqueous solvents, such as copper ammonium hydroxide, quaternary ammonium hydroxide, and several transition metal complexes. Many of the problems encountered in the preparation of cellulose derivatives could be greatly reduced or eliminated by the use of an organic solvent for cellulose which permits the formation of homogeneous organic solutions of unmodified cellulose.

SUMMARY OF THE INVENTION

It is an object of the present invention to disclose novel homogeneous solutions of cellulose which can be used to prepare cellulose derivatives and other chemical reactions.

It is a further object to disclose methods of preparing known and new cellulose derivatives using the novel solutions of cellulose of the present invention.

It has now been discovered that cellulose can be dissolved in a solvent mixture of lithium chloride and dimethylacetamide. The resulting cellulose solutions can be used to prepare a wide variety of cellulose derivatives under mild conditions by esterification, etherification, carbamate formation and other types of chemical reactions.

The novel homogeneous solutions of cellulose in lithium chloride and dimethylacetamide are preferably prepared by adding the cellulose to dimethylacetamide containing up to 8% lithium chloride by weight and, if necessary, subjecting the resulting mixture to sequential heating and cooling steps until the cellulose is dissolved.

The exact mechanism by which the cellulose dissolves in the mixture of lithium chloride and dimethylacetamide is not known and certainly could not have been predicted from the prior art.

Although solutions of chitin in dimethylacetamide and/or N-methylpyrrolidone and lithium chloride have been reported by Austin in U.S. Pat. Nos. 4,059,457 and 4,062,921, it was unexpected to discover that cellulose could be dissolved in dimethylacetamide and lithium chloride mixtures. Because of the known differences in the chemical and the physical properties of chitin and cellulose, the disclosure of the Austin patents did not suggest to those skilled in the art that cellulose could be dissovled in a lithium chloride and dimethylacetamide solution. For example, see the comprehensive articles entitled "Cellulose Solvents" Trubak et al, *Chemtech* January 1980, pages 51 to 57, and "Non-Aqueous Solvents of Cellulose" Philipp et al, *Chemtech*, November 1977, pages 702 to 709.

It has also been discovered that not only purified cellulose but apparently cellulose from any source, including cotton linters, wood and paper, can be used. It appears that only the rate of dissolution changes with the different type of cellulose source due to the molecular weight, crystallinity and lignin content.

In addition, it has been discovered that by dissolving cellulose and lignin containing materials in dimethylacetamide and lithium chloride mixtures the lignin can be separated from the cellulose by differential precipitation.

It has also been discovered that both known and novel cellulose derivatives including films and fibers can be prepared using the novel homogeneous solutions of cellulose of the present invention. For example, the novel homogeneous cellulose solutions of the present invention make possible new synthetic routes to prepare cellulose ethers and esters with a high degree of substitution per repeating unit. Compared to a heterogeneous solution synthesis, the use of a homogenous solution possesses these following advantages:

(1) the reaction can be conducted under lower temperature and pressure conditions;

(2) less reagent is used;

(3) a more uniform substitution results;

(4) reactions previously limited to the use of anhydride systems, can now be employed utilizing organic acid chlorides, and (5) there is less degradation of the cellulose.

A number of other uses for the novel cellulose solvents of the present invention will be apparent to those skilled in the art.

DESCRIPTION OF THE PREFERRED EMBODIMENT

In the preferred embodiment of the present invention the cellulose solutions contain up to about 3% by weight of cellulose and 2 to 8% by weight of lithium chloride in dimethylacetamide. Solutions containing up to 8 to 10% of cellulose can be prepared with the use of pressure but such solutions are relatively viscous and may be unstable.

The cellulose solutions are preferably prepared by introducing the cellulose with stirring into the solvent mixture of lithium chloride and dimethylacetamide and heating and maintaining the resulting mixture at about 150 degrees C. If the cellulose does not dissolve, the mixture may be alternately heated to about 100 degrees C. and cooled to about 50 degrees C. until solution is obtained.

The lithium chloride and dimethylacetamide are required ingredients of the solvent mixture. The substitution of other lithium salts and organic solvents does not yield comparable results.

The cellulose that can be dissolved in the solvent mixture of lithium chloride and dimethylacetamide can be either native or unmodified cellulose from practically any source as well as regenerated cellulose. The cellulose can be of relatively low molecular weight, such as that obtained from wood or of high molecular weight, such as that obtained from cotton linters. Any lignin that is present with the cellulose also dissolves in the lithium chloride and dimethylacetamide solution. However, the lignin and cellulose can be separated by differential precipitation using methanol.

The practice of the present invention is further illustrated by the examples which follow:

EXAMPLE 1

Preparation of Cellulose Solution

Fifteen grams of cellulose (Baker reagent grade with particle size of 75-150u) was suspended in 1500 ml of dimethylacetamide which contained 75 g of lithium chloride. The system was heated from room temperature to 150 degrees C. over 1 to 1.5 hours with stirring, and kept at 140-150 degrees C. for 10 to 20 minutes. Then the system was cooled to room temperature slowly with stirring. The cellulose was dissolved after cooling to room temperature.

EXAMPLE 2

Synthesis of methyl cellulose

One hundred grams of cellulose solution, prepared as described in Example 1, was charged into a 250 ml 3-necked, round-bottomed flask. Sodium hydroxide powder (0.8 g) suspended in 3 ml dimethylacetamide (DMAC) was added, and heated to 70-80 degrees C. for 40 minutes. After being cooled to room temperature, 2 ml of dimethyl sulfate was added. The temperature was raised to 60 degrees C. and maintained for 1 hour, then cooled to room temperature again. Another 0.6 g of sodium hydroxide suspended in 3 ml DMAC was added, and the mixture was heated to 70 degrees C. for 40 minutes then cooled to room temperature. Another 2 ml of dimethyl sulfate was added without heating. Then the reaction was stirred for 8 hours at room temperature and the polymer was precipitated by adding methanol. The filtered polymer was washed with methanol water acetic acid (85:10:5 v/v) mixture and then with methanol. The polymer was dried under reduced pressure at 50 degrees C. for 2 days, yield 1.4 g. The polymer dissolved in cold water.

EXAMPLE 3

Synthesis of hydroxyl ethyl cellulose 100 ml of cellulose solution, prepared as in Example 1, was charged into a 250 ml 3-necked, round-bottomed flask. About 1.5 ml of ethylene oxide was added into the closed system five times at ½ hour intervals. After 3 hours of further reaction, the gel type solution was precipitated by adding isobutanol. The filtered polymer was washed with methanol and dried under reduced pressure for 2 days at 50 degrees C., yield 1.2 g. The dried polymer was soluble in cold water. Sodium hydroxide was used as a base catalyst.

EXAMPLE 4

Synthesis of Carboxy-methyl cellulose 100 ml of cellulose solution, prepared as in Example 1, and 3.5 ml of tetraethyl ammonium hydroxide (80% in methanol) were introduced into a 350 ml 3-necked round-bottomed flask. The system was stirred for 1 hour at room temperature then 5 g of sodium chloroacetate was added. After 8 hours further reaction at room temperature, the polymer was precipitated with $CH_3OH$. The polymer was dried under reduced pressure for 2 days at 50 degrees C., yield 1.3 g. The polymer was soluble in water.

EXAMPLE 5

Synthesis of Benzyl cellulose 100 ml of cellulose solution, prepared as in Example 1, was heated with 0.8 g of sodium hydroxide powder at 45-50 degrees C. for 40 minutes. After cooling, 4 g of benzyl chloride was added. The mixture was stirred for 6 hours and then another 0.4 g of sodium hydroxide was added and heated to 45-50 degrees for 30 minutes. After cooling, another 3 g of benzyl chloride was added. The reaction mixture was stirred for 8 hours, the polymer was precipitated with methanol-water-acetic acid (85:10:5 v/v) mixture and washed with methanol. After being dried under reduced pressure at 50 degrees C. for 40 hours, the yield was 1.3 g of polymer.

EXAMPLE 6

Synthesis of Cellulose acetate

To 100 ml of cellulose solution, prepared as in Example 1, 0.5 ml of 71% perchloric acid was added. The mixture was vigorously stirred for 15 minutes. Then 7 ml of acetic anhydride was added. The reaction was carried out for 1 day at room temperature and then 2 hours at 40 degrees C. The polymer was separated by adding isobutanol into the reaction mixture and washed with methanol. The polymer was dried under reduced pressure at 50 degrees C. for 2 days, yield was 1.7 g. The polymer exhibited low Tg (less 40 degrees C.).

EXAMPLE 7

Synthesis of Cellulose phenylacetate

A solution of one gram of cellulose (18.5 mmol hydroxyl) in 99 g of solvent (5% LiCl in DMAC) was prepared and placed in a 250 ml three-necked round-bottomed flask filtered with a condenser, an additional funnel, a nitrogen inlet, and magnetic stirring. Pyridine (7.5 ml, 7.3 g, 92.6 mmol) was added with stirring. Next phenylacetyl chloride (Aldrich, 7.2 ml, 8.6 g, 55.5 mmol) was added over one hour at room temperature. During a period of rapid addition, the temperature increased to 36 degrees C. Slow addition is necessary to maintain temperature at or near ambient. The reaction mixture was stirred under nitrogen for twenty more hours at room temperature, then precipitated directly in 500 ml of methanol in a Waring Blender at slow speed.

The highly swollen precipitate was collected and washed with methanol on Whatman Number 1 Qualitative filter paper and dried at 50 degrees C. in vacuum. The polymer is soluble in DMF. A clear film cast from DMF showed the following major indicative infrared absorptions.

| | | |
|---|---|---|
| 3450 cm $-1$ | (broad) | residual hydroxy |
| 3000–3100 cm $-1$ | | aromatic O—H |
| 1735–1740 cm $-1$ | | ester carbonyl |
| 770 cm $-1$ | | phenylacetyl group frequency |
| 700 cm $-1$ | | aromatic O—H deformation |

EXAMPLE 8

Two to three grams of powdered cellulose (Polysciences Lot Number 1737-1; Cat. Number 0230) was added to 100 ml of a 5% LiCl/DMAC solvent system. The mixture was heated to 150 degrees C. with stirring until a dark brown color emerged and the solution was clear. The polymer was precipitated in absolute methanol and filtered through Whatman Number 1 filter paper using a buchner funnel and 500 ml vacuum Erlynmeyer flask. The cellulose precipitate was returned to another 100 ml of 5% LiCl/DMAC for redissolving and the filtrate was concentrated under vacuum with stirring—(no heat). The concentrate was dried in a vacuum desiccator for 48 hours. The resulting residue had a very high relative viscosity.

Representative of the organic reactions utilizing the hydroxyl functionality of cellulose in which the novel solutions may find application are the following:

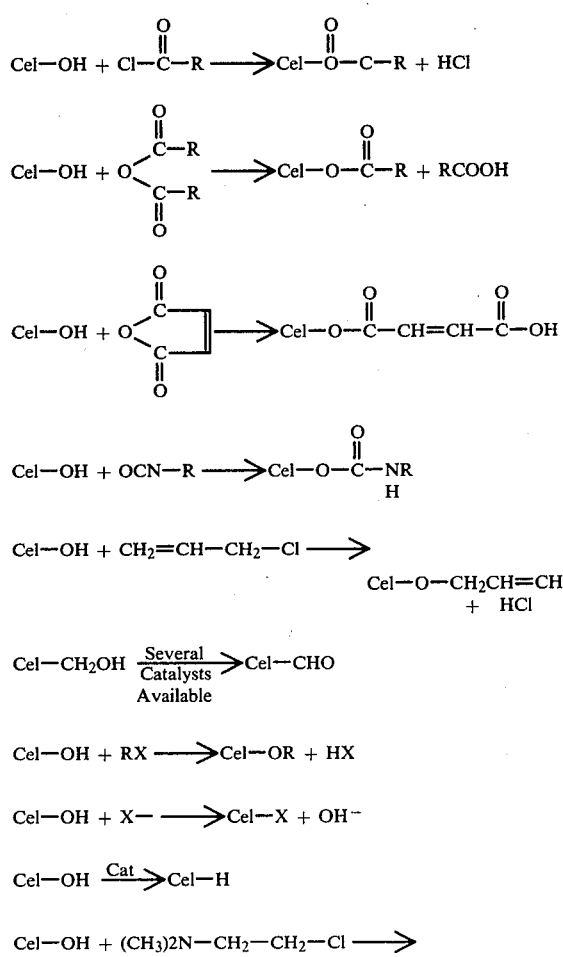

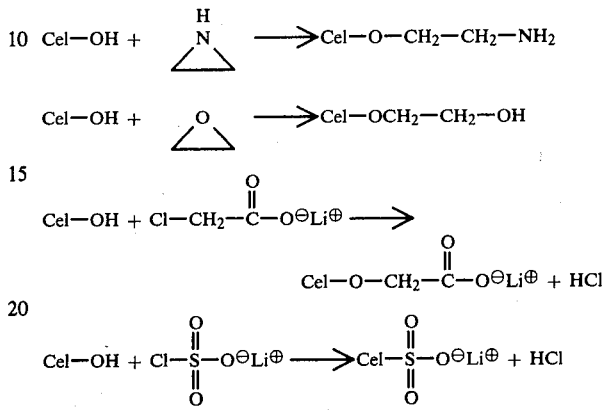

Cellulose has 3 hydroxyl groups per molecule and each can react as illustrated in the examples shown above. When all three react on each repeating unit the degree of substitution is three. If only one reacts the degree of substitution is one.

The homogeneous solutions of the present invention allow the degree of substitution to be varied from low values DS less than 0.01 to DS=3 (maximum).

It will be apparent to those skilled in the art that the cellulose solutions disclosed may have applications other than those specifically described, especially in the chemical industry, the paper industry and the fiber industry. Therefore, it is intended that the scope of the claims not be limited to the specific examples of reactions described but only by the claims which follow:

I claim:
1. A homogeneous solution containing cellulose in lithium chloride and dimethylacetamide.
2. A solution of claim 1 which contains up to about 8% lithium chloride on a weight/weight basis.
3. A solution of claim 1 containing up to about 3% of cellulose on a weight/weight basis.
4. The method of preparing a homogeneous solution of cellulose which comprises adding cellulose to a solution of lithium chloride in dimethylacetamide.
5. The method of claim 4 in which the solution of lithium chloride in dimethylacetamide containing cellulose is alternately heated and cooled until the cellulose is dissolved.
6. The method of claim 4 in which the solution contains up to about 8% lithium chloride on a weight/weight basis.
7. In the method of preparing cellulose derivatives from cellulose, the step which comprises first dissolving the cellulose in a solution of lithium chloride and dimethylacetamide.
8. In the method of preparing cellulose derivatives by chemical reactions utilizing the hydroxyl functionality of the cellulose, the improvement which comprises using as the cellulose reactant, a solution of cellulose in lithium chloride and dimethylacetamide.
9. The method of claim 8 in which the cellulose derivative being prepared is a cellulose ether.
10. A method of separating lignin from cellulose which comprises dissolving the cellulose in a solution of lithium chloride and dimethylacetamide and then separating the lignin from the cellulose by differential precipitation using methanol.

* * * * *